J. W. FRENCH.
PERISCOPE AND LIKE INSTRUMENT.
APPLICATION FILED NOV. 12, 1918.
1,316,438.
Patented Sept. 16, 1919.
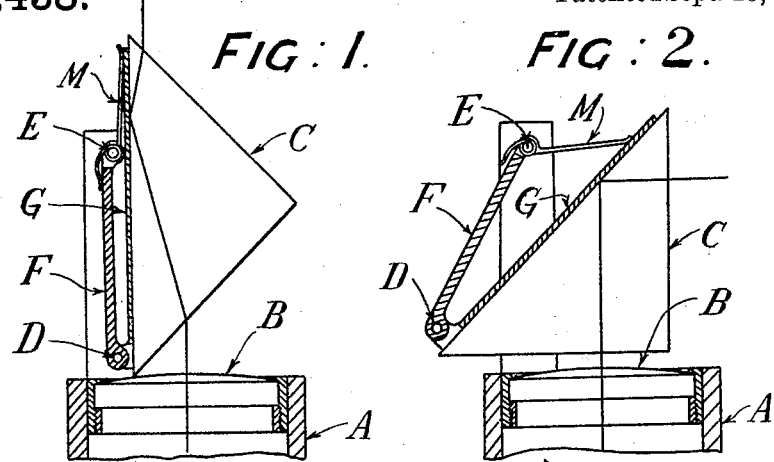
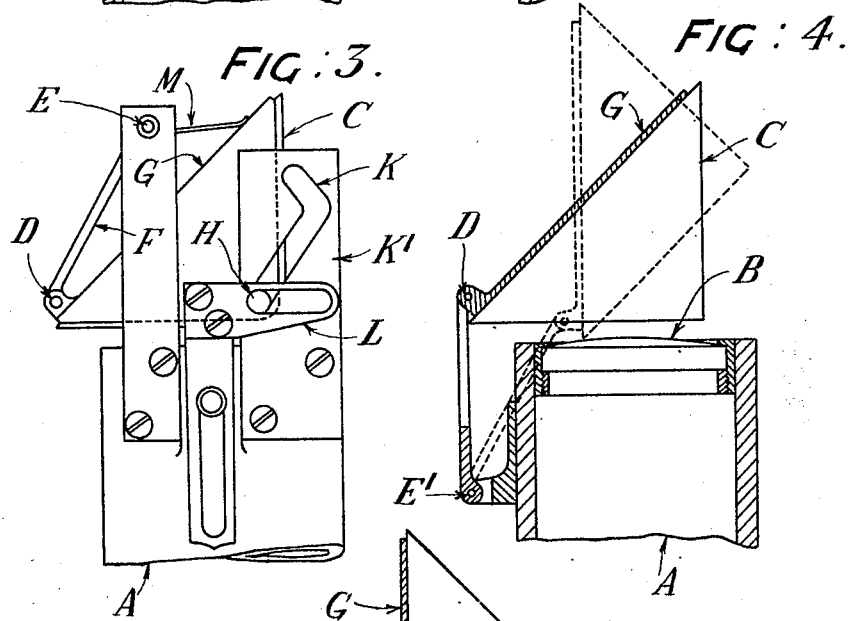
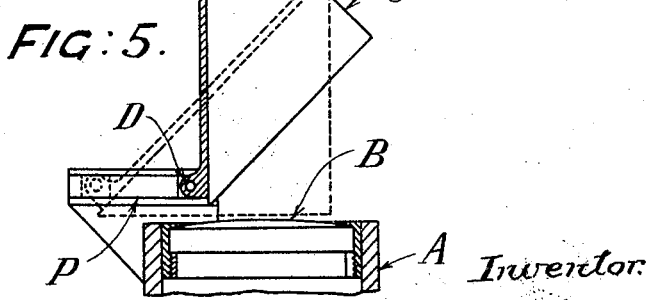
Inventor
James Weir French
By T. Walter Fowler
Atty.

UNITED STATES PATENT OFFICE.

JAMES WEIR FRENCH, OF ANNIESLAND, GLASGOW, SCOTLAND, ASSIGNOR TO BARR AND STROUD LIMITED, OF ANNIESLAND, GLASGOW, SCOTLAND.

PERISCOPE AND LIKE INSTRUMENT.

1,316,438.          Specification of Letters Patent.     Patented Sept. 16, 1919.

Application filed November 12, 1918. Serial No. 262,234.

*To all whom it may concern:*

Be it known that I, JAMES WEIR FRENCH, a subject of the King of Great Britain and Ireland, and a resident of Caxton street, Anniesland, Glasgow, Scotland, have invented new and useful Improvements in or Connected with Periscopes and like Instruments, of which the following is a specification.

This invention relates to periscopes and like instruments, hereinafter referred to generally and in the claims as periscopes, of the type comprising a head reflector capable of angular adjustment to enable observations to be made at various angles, such, for example, as those extending from the horizon to the zenith. In periscopes of this type, a prism reflector is used which it is desirable should be placed close to the objective to which the reflected rays are directed.

This invention consist of a new or improved method of and means for mounting and operating the prism whereby the angular adjustments required may be made and the position of the prism so altered that the rays of the light reflected by the prism shall for all angular adjustments be directed into the objective.

The method consists in mounting the prism capable of angular adjustment about an axis at right angles to the plane in which the observations are to be made and the axis of the objective is contained, which plane, in the case of those extending from the horizon to the zenith, would be vertical. This axis of adjustment, according to this invention, is made laterally movable in a direction toward or away from the axis of the objective, and is moved in relation to the angular movements of the prism. This method enables the axis of angular adjustment to be placed close to the objective and a small prism to be used, with other attendant advantages.

Some examples of the application of the method to a right angled prism will now be described with reference to the accompanying drawing, in which:—

Figure 1 is a sectional elevation with the prism in position for observations about the zenith, Fig. 2 is a similar view with the prism in position for observations about the horizon, and Fig. 3 is a side elevation corresponding to Fig. 2 showing means for guiding and operating the prism.

Figs. 4 and 5 are sectional elevations illustrating modifications.

In the drawing, A designates the head of a periscope, the axis of which will be considered vertical, B the objective to which the reflected rays are directed, and C the right angle prism.

In these cases the rays are reflected from the interior hypotenusal face of the prism, and in its application at the head of the periscope A as shown of which the axis is vertical, the axis of angular adjustment D about which the prism C is mounted is horizontal and parallel with the lower edge of the hypotenusal face, one of the right angle faces constituting the incident face and the other right angle face the emergent face, the incident face being above the emergent. For observations about the horizon, see Fig. 2, the emergent face, opposite the objective, is horizontal, the hypotenusal face is at 45° and the incident face is vertical. For observations about the zenith the hypotenusal face is turned into the vertical, see Fig. 1, the incident and emergent faces being moved accordingly each through an angle of 45°. The lateral movement to be imparted to the axis of angular adjustment D, as the prism is turned from its position for horizon observations to those about the zenith, is such as will direct the reflected beam into the objective B. The extent of lateral movement required in relation to the extent of the angular movement imparted to the prism C varies, and variation in this respect may involve the lateral movement being greatest in the inital movement of turning the prism from its position for making observations about the horizon into that for making them about the zenith.

For practical purposes the required movements may be obtained with sufficient accuracy by mounting the prism in the manner shown at Figs. 1, 2 and 3, to swing about an axis E parallel to and arranged above the axis of angular adjustment D, the axis of swing E being so arranged as to be vertically or approximately so above the axis of adjustment D when the prism C is in position for zenith observations. The axis of adjustment D is suspended from the axis of swing by link connection F and the prism C is mounted upon a carrier G pivoted about the axis of angular adjustment D, the carrier at its outer end being provided with a guiding device, which may conveniently be of cam character. For instance, see Fig. 3, the carrier G may be provided with a stud H arranged to project into a cam groove K formed in a vertical part $K^1$ fixed to the frame of the instrument, and provision made for raising and lowering the stud H, for instance, by means of a slotted arm L having a laterally directed slot into which the stud H projects. With the prism in position for horizon observations, upon raising the slotted arm L the stud H travels upward in the cam groove K and a movement is imparted to the carrier G and with it the prism C about the axis of adjustment D. This movement comprises angular movement about the axis of adjustment D and lateral movement of the axis of adjustment D toward the axis of the objective, the lateral movement being a circular movement about the axis of swing E. In the form shown, the character of the initial part of the cam groove K is straight but angularly inclined terminating in an upper part which is concentric to the axis of angular adjustment D, so that in the final movement of the stud H no further lateral movement is imparted to the axis of adjustment D, angular adjustment of the prism only being effected. With a cam groove K of this description the slot in the arm L may, as shown, be horizontal. The steadiness of prism C may be improved by providing a spring M fitted about the axis E, having one arm arranged to bear upon link connection F and another upon the carrier G.

It will, however, be understood that other ways of mounting the prism and other means for operating it may be adopted in order to carry out the method according to this invention. For instance, the axis of angular adjustment D may, as shown at Fig. 4, be above the axis of swing $E^1$, and the cam mechanism modified accordingly, or the axis of angular adjustment D might, as shown at Fig. 5, be mounted to slide in fixed guides P instead of being swung.

Periscopes according to this invention are particularly adapted for use on board submarines from which observations are required to be made about the horizon and in the sky.

I claim:

1. A periscope having a prism reflector at the head of the periscope mounted capable of angular adjustment about an axis at right angles to the plane in which the observations are to be made and the axis of the objective to which the reflected rays are directed is contained, the axis of angular adjustment being laterally movable in a direction toward or away from the axis of the objective associated with means for regulating the lateral movement in relation to the angular movements of the prisms, substantially as set forth.

2. A periscope having a prism head reflector placed close to the objective to which the reflected rays are to be directed, a pivot support for the reflector having its axis at right angles to the plane in which the observations are to be made and the axis of the objective is contained, means for guiding the support so that its axis is guided laterally in a direction toward or away from the axis of the objective, and means for effecting angular adjustments of the reflector about the axis of the support and for imparting to the support lateral movements in relation to the angular adjustments, for the purposes set forth.

3. A periscope having a right angled prism head reflector placed close to the objective to which the reflected rays are to be directed, a pivot support for the reflector having its axis at right angles to the plane in which the observations are to be made and the axis of the objective is contained, means for guiding the support so that its axis is guided laterally in a direction toward or away from the axis of the objective, and means for effecting angular adjustments of the reflector about the axis of the support and for imparting to the support lateral movements in relation to the angular adjustments, for the purposes set forth.

4. A periscope, the axis of which will be considered vertical, having a right angled prism head reflector placed close to the objective to which the rays are directed by reflection from the interior hypotenusal face of the prism, a pivot support for the reflector having its axis parallel with the lower horizontal edge of the hypotenusal face of the prism and at right angles to the plane in which the observations are to be made and the axis of the objective is contained, means for guiding the support so that its axis is guided laterally in a direction toward or away from the axis of the objective, and means for effecting angular adjustments of the reflector about the axis of the support and for imparting to the support lateral movements in relation to the angular adjustments, for the purposes set forth.

5. A periscope, the axis of which will be considered vertical, having a right angled prism head reflector placed close to the objective to which the rays are directed by reflection from the interior hypotenusal face of the prism, a pivot support for the reflector having its axis parallel with the lower horizontal edge of the hypotenusal face of the prism and at right angles to the plane in which the observations are to be made and the axis of the objective is contained, means for guiding the support so that it swings about an axis parallel to the axis of the support, and means for effecting angular adjustments of the reflector about the axis of the support and for imparting to the support lateral movements in relation to the angular adjustments, for the purposes set forth.

6. A periscope, the axis of which will be considered vertical, having a right angled prism head reflector placed close to the objective to which the reflected rays are directed by reflection from the interior hypotenusal face of the prism, a pivot support for the reflector having its axis parallel with the lower horizontal edge of the hypotenusal face of the prism and at right angles to the plane in which the observations are to be made and the axis of the objective is contained, means for guiding the support so that it swings about an axis parallel to the axis of the support, a stud fixed to the prism, a part fixed to the periscope having a cam groove into which the stud projects, and means for raising and lowering the stud, for the purposes set forth.

7. A periscope, the axis of which will be considered vertical, having a right angled prism head reflector placed close to the objective to which the rays are directed by reflection from the interior hypotenusal face of the prism, a pivot support for the reflector having its axis parallel with the lower horizontal edge of the hypotenusal face of the prism and at right angles to the plane in which the observations are to be made and the axis of the objective is contained, means for guiding the support so that it swings about an axis parallel to and above the axis of the support, and means for effecting angular adjustments of the reflector about the axis of the support and for imparting to the support lateral movements in relation to the angular adjustments, for the purposes set forth.

JAMES WEIR FRENCH.

Copies of this patent may be obtained for five cents each, by addressing the "Commissioner of Patents, Washington, D. C."